United States Patent [19]

Miyo et al.

[11] Patent Number: 5,457,710
[45] Date of Patent: Oct. 10, 1995

[54] METHOD AND CIRCUIT FOR DETECTING BURST SIGNAL

[75] Inventors: Tokihiro Miyo; Mitsuhiro Ono; Toshio Kawasaki, all of Kawasaki, Japan

[73] Assignee: Fujitsu Limited, Kawasaki, Japan

[21] Appl. No.: 962,116

[22] Filed: Oct. 16, 1992

[30] Foreign Application Priority Data

Oct. 16, 1991 [JP] Japan ................. 3-267633

[51] Int. Cl.⁶ ................................. H04L 27/06
[52] U.S. Cl. ......................... 375/340; 375/324
[58] Field of Search ................ 375/94, 80, 88, 375/39, 44, 45, 52, 316, 340, 324, 322, 271, 334, 272, 261, 224, 226; 455/205; 329/300, 304, 315; 324/76.52, 76.74; 364/510; 370/95.3; 307/2

[56] References Cited

U.S. PATENT DOCUMENTS

| | | | |
|---|---|---|---|
| 4,466,108 | 8/1984 | Rhodes | 375/97 |
| 4,485,448 | 11/1984 | Kurth | 375/80 |
| 4,603,300 | 7/1986 | Welles, II et al. | 329/50 |
| 4,799,025 | 1/1989 | Le Quéau | 375/80 |
| 5,023,940 | 6/1991 | Johnson et al. | 455/222 |
| 5,170,415 | 12/1992 | Yoshida et al. | 375/80 |
| 5,289,391 | 2/1994 | Ibrahim et al. | 375/340 |

FOREIGN PATENT DOCUMENTS

| | | |
|---|---|---|
| 3915779 | 11/1990 | Germany . |
| 91/03883 | 3/1991 | WIPO . |

*Primary Examiner*—Stephen Chin
*Assistant Examiner*—Tesfaldet Bocure
*Attorney, Agent, or Firm*—Staas & Halsey

[57] ABSTRACT

A phase angle $\theta$ of a received signal is calculated according to a formula $\theta = \tan^{-1}(Q/I)$, where I and Q are magnitudes of baseband signals obtained by quadrature detection of the received signal. An angular velocity $\Delta\theta$ of the phase angle $\theta$ is also calculated. A variance parameter $\Sigma\sigma^2$ is calculated from a deviation $\sigma = \Delta\theta - \widetilde{\Delta\theta}$, where $\widetilde{\Delta\theta}$ is a moving average of the $\Delta\theta$. The variance parameter $\Sigma\sigma^2$ thus calculated, is compared with a reference value to determine if a burst signal exists. Since the determination is performed essentially based on a phase of the received signal and not on an amplitude of the received signal, fluctuation of the amplitude of the received signal does not affect the decision.

14 Claims, 5 Drawing Sheets

METHOD AND CIRCUIT FOR DETECTING BURST SIGNAL

BACKGROUND OF THE INVENTION

1. Field of the Invention

The present invention relates to a method and a circuit for detecting the existence of a burst signal in received signals and outputting detection signal in response.

2. Description of the Related Art

In a low-speed burst modem, various controls, such as switching of an operation mode of a PLL (Phase Lock Loop) and switching of a bandwidth of the PLL, are carried out in order to realize a rapid pull-in performance during a period of receiving a carrier recovery training signal part located at the front of a burst signal. To effect those controls, the exact time of receipt of a preamble portion of the burst signal must be exactly known.

In a communication system such as a TDMA (Time Division Multiple Access) system, once synchronization is established, a time position of the preamble can be predicted in advance. Thus, the preamble information can be obtained from a synchronization control part of a receiver side.

In a communication system such as a packet signal transmission employing an aloha system or an SCPC (Single Channel Per Carrier) system equipped with voice-activation, where signals randomly generated are transmitted each time they are generated, a time position of a preamble a burst signal cannot be predicted in advance at the receiving side.

Therefore, the burst preamble must be independently detected in a burst demodulator itself to conduct the aforementioned controls. The burst preamble has, so far, been detected by envelope detection. More specifically, an envelope signal of baseband signals is generated by calculating, for example, $\sqrt{I^2+Q^2}$, where I and Q are magnitudes of baseband signals orthogonal to each other that are obtained by quadrature detection. The generated envelope signal is smoothed to eliminate noise components and a level of the smoothed envelope signal is compared with a threshold level. When the level of the envelope signal becomes higher than the threshold level, it is determined that a burst signal has been received.

The above conventional method of detecting the burst signal has the following shortcomings because existence of the burst signal is decided based on an amplitude of a received signal.

1) If the threshold level is set to too large value, detection fails, such that signals are determined to be nonexistent even though a signal does in fact exist. Conversely, if the threshold level is set to too small value, it is determined that a signal exists due to noise even though a signal does not exist, and therefore, a detection error occurs.

2) When an amplitude of a signal fluctuates, the frequency with which the above detection failure and detection error occurs increases. Therefore, a permitted range of fluctuation of the signal amplitude is strictly limited.

3) If an automatic gain control (AGC) operates while signals do not exist, gain increases, so that a noise level becomes equal to the signal level. Thus, the AGC cannot be used before the preamble is detected.

4) Error correction techniques in data transmission have progressed to the point that reproduction of data is possible even though a signal to noise ratio is 0 dB. Therefore, it is required that the burst signal detection is also possible in such a situation.

SUMMARY OF THE INVENTION

It is an object of the present invention to provide a method and a circuit for detecting an existence of a burst signal, that can exactly detect the existence of the burst signal even when quality of a received signal is poor.

In accordance with the present invention, there is provided a method of detecting existence of a burst signal in received signals, comprising the steps of calculating a first parameter related to a phase angle of the received signals, calculating a second parameter related to a variance of the first parameter, comparing the second parameter with a reference value, and outputting a detection signal according to a result obtained in the comparing step.

In accordance with the present invention, there is also provided a circuit for detecting the existence of a burst signal in received signals, comprising units for calculating a first parameter related to a phase angle of the received signals, calculating a second parameter related to a variance of the first parameter, and comparing the second parameter with a reference value, to thereby output a detection signal according to a result of the comparison.

DESCRIPTION OF THE PREFERRED EMBODIMENTS

Figure 1:
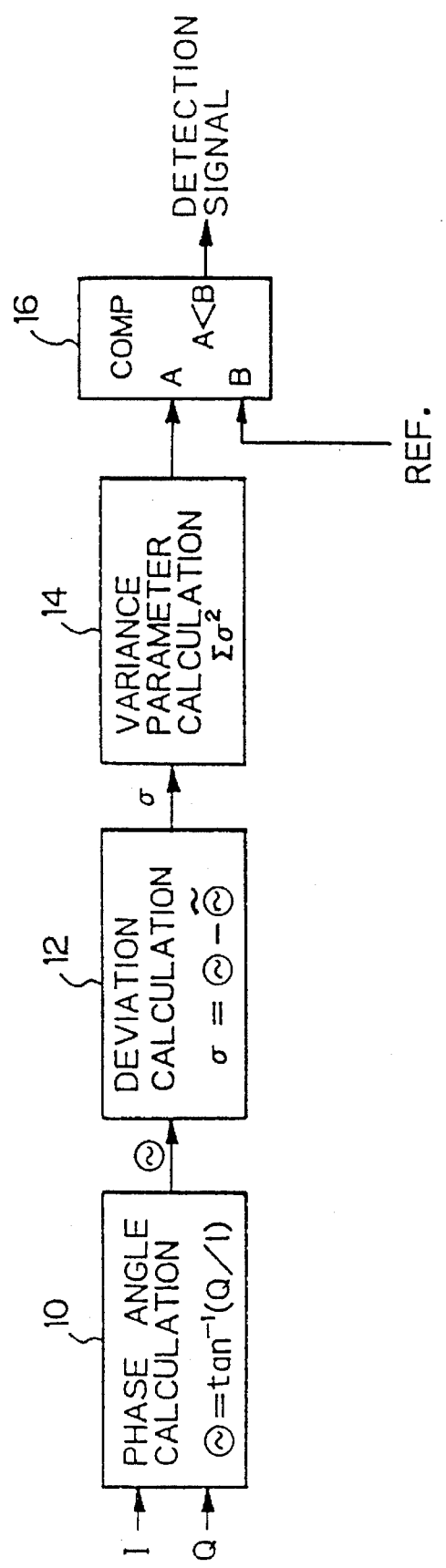
FIG. 1 is a functional block diagram of a burst signal detection circuit according to a first embodiment of the present invention.

FIG. 1 shows a basic construction of a burst signal detection circuit according to an embodiment of the present invention. In FIG. 1, the circuit comprises a phase angle calculation unit 10, a deviation calculation unit 12, a variance parameter calculation unit 14 and a comparator 16.

Two baseband signals I and Q obtained by quadrature detection in a preceding stage (not shown) are input to the phase angle calculation unit 10. The phase angle calculation unit 10 calculates an angle of a phase of a received signal with a phase of a reference signal that has been used in the quadrature detection, according to the following formula:

$$\theta = \tan^{-1}(Q/I) \qquad (1)$$

The deviation calculation unit 12 calculates a deviation σ of the observed phase angle θ from expectation Θ of the angle θ, according to the following formula:

$$\sigma = \theta - \Theta \qquad (2)$$

The variance parameter calculation unit 14 calculates a parameter related to a variance of the observed phase angle, for example, $\Sigma\sigma^2$. The comparator 16 compares the variance parameter output from the variance calculation unit 14 with a reference value, and outputs a detection signal if the variance parameter is smaller than the reference value.

Figure 2:
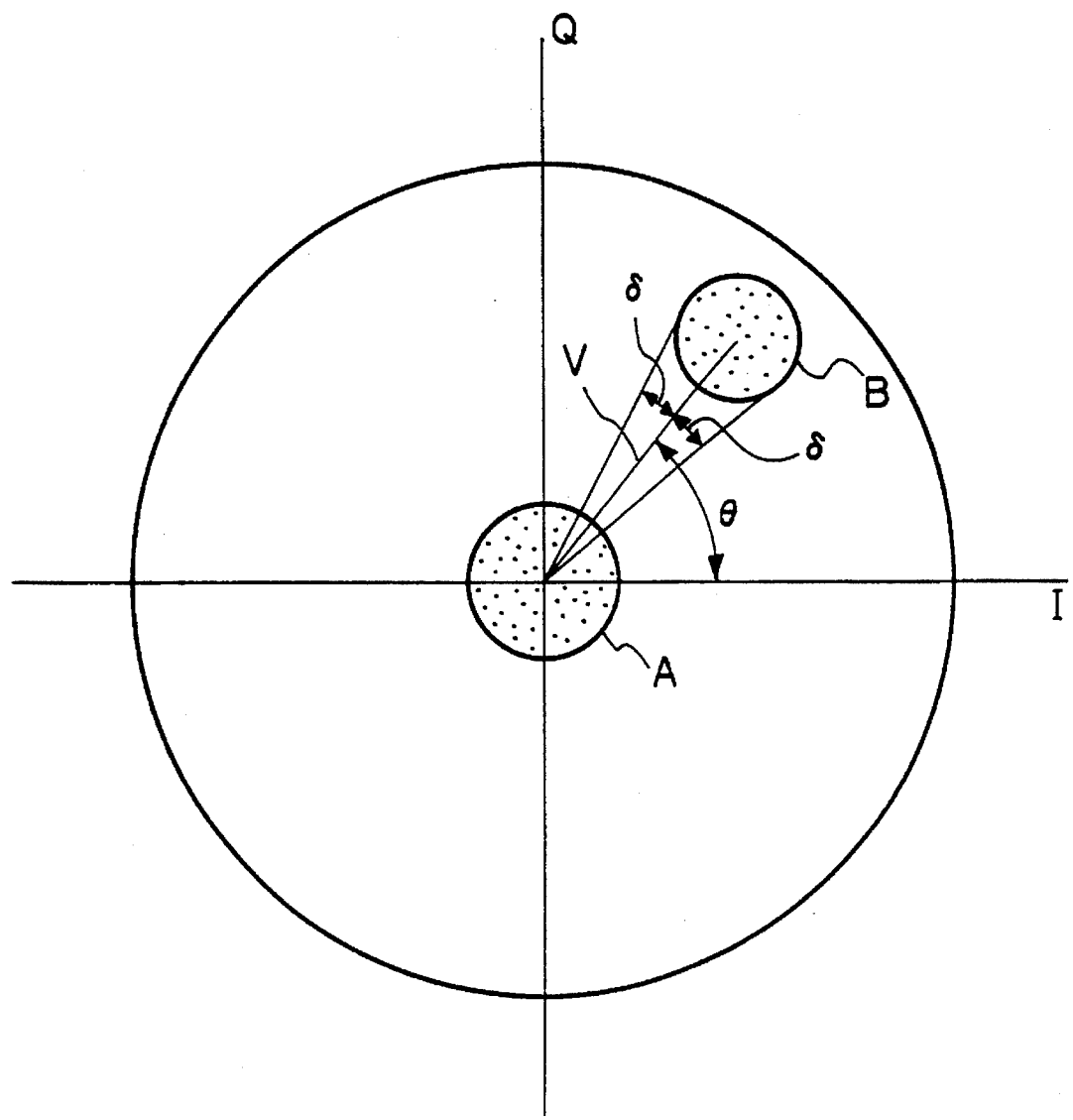
FIG. 2 is a diagram for explaining a principle of the present invention.

As shown in FIG. 2, while signals do not exist except for random noises, received signals distribute around the origin of coordinate axes I and Q within a circle A on a plane of orthogonal coordinate axes I and Q. The angle θ uniformly distributes within a range from 0° to 360°. If a signal, for example, a carrier recovery training signal of the burst signal exists, a vector V of the existing signal is added and then the received signal distributes within a circle B. Therefore, the angle θ distributes within a range from θ−δ to θ+δ where θ is an angle of the signal vector.

The circuit of FIG. 1 detects existence of the signal utilizing the above difference in an extent of distribution of the angle θ between the case where a signal exists and the case where signals do not exist.

If a complete synchronization can be effected in the quadrature detection so that the phase angle θ becomes stationary before the burst signal is detected, the burst signal can be detected in the circuit of FIG. 1 by using the angle of the signal vector or a moving average of the observed phase angle θ as the expectation of θ. However, it is not practical to synchronize the reference signal with the received signal before the signal is detected.

Therefore, it is preferable to use the following formula (3) instead of the formula (2):

$$\sigma = \Delta\theta - \overline{\Delta\theta} \quad (3)$$

where $\Delta\theta$ is the difference between two successive samples of the angle θ and $\overline{\Delta\theta}$ is an expectation of the $\Delta\theta$. The difference $\Delta\theta$ corresponds to an angular velocity of the variation of the angle θ. While the received signal is in semi-synchronizm with the reference signal that has been used in the quadrature detection, the angle θ varies at a constant angular velocity corresponding to the difference between the frequencies of the received signal and the reference signal. Therefore, a variance of the deviation σ calculated using the formula (3) becomes smaller while a burst signal is received than while signals are not received.

Figure 3:
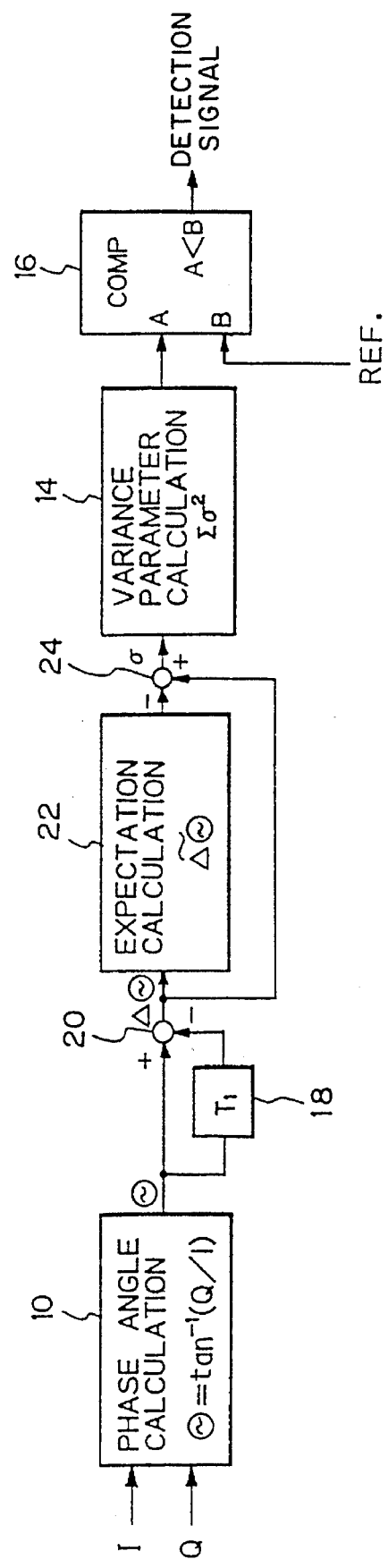
FIG. 3 is a functional block diagram of a burst signal detection circuit according to a second embodiment of the present invention.

FIG. 3 shows a construction of a burst signal detection circuit according to the above principle. The output signal of the phase angle calculation unit 10 is delayed by one sample interval in a delay unit 18. The angular velocity $\Delta\theta$ is calculated by subtracting the delayed phase angle from a current phase angle in a subtracter 20. An expectation calculation unit 22 calculates an expectation $\overline{\Delta\theta}$ of the angular velocity $\Delta\theta$. The deviation σ is calculated by subtracting the expectation $\overline{\Delta\theta}$ from an instantaneous value $\Delta\theta$ in a subtracter 24.

Figure 4:
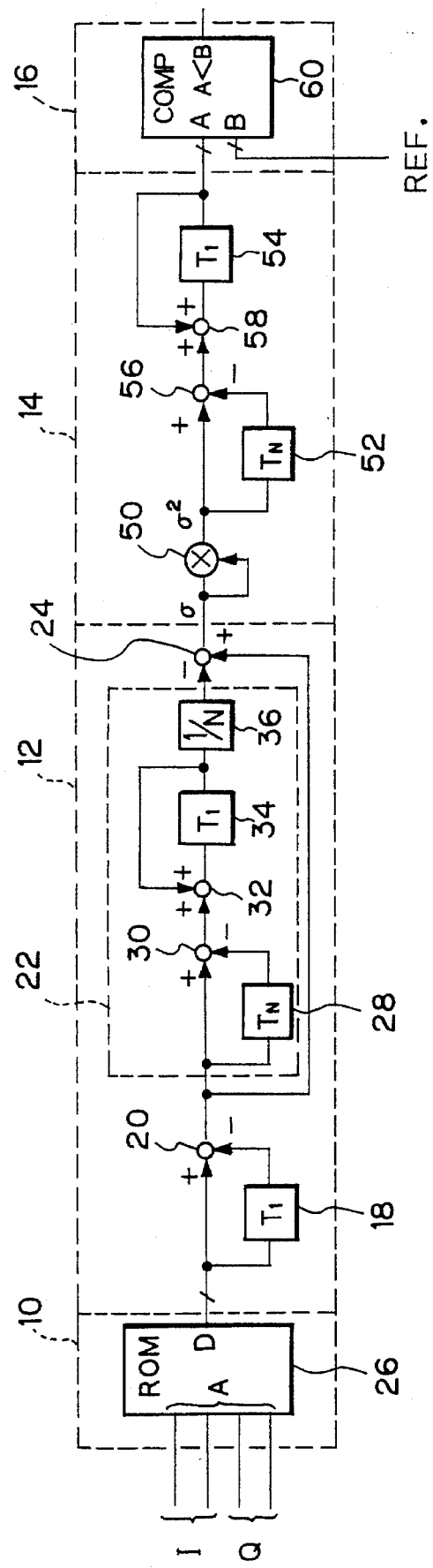
FIG. 4 is a circuit diagram showing a detailed construction of the burst signal detection circuit of FIG. 3.

FIG. 4 shows a detailed construction of the burst signal detection circuit of FIG. 3.

The phase angle calculation unit 10 is realized by a read only memory (ROM) 26. ROM 26 has an address input connected to each bit of the digital baseband signals I and Q, and stores values of the phase angle θ that have been calculated in advance according to the formula (1) in corresponding memory cells.

The expectation calculation unit 22 is realized by a moving average calculation circuit consisting of a delay element 28, a subtractor 30, an adder 32, a delay element 34, and a divider 36. The delay element 28 delays input data by N sample intervals and the delay element 34 delays input data by one sample interval. The circuit consisting of the delay elements 28 and 34, the subtractor 30, and the adder 32 calculates a sum of recent N samples of input data. To explain this operation of the circuit, the circuit is equivalently modified as shown in FIG. 5.

Figure 5:
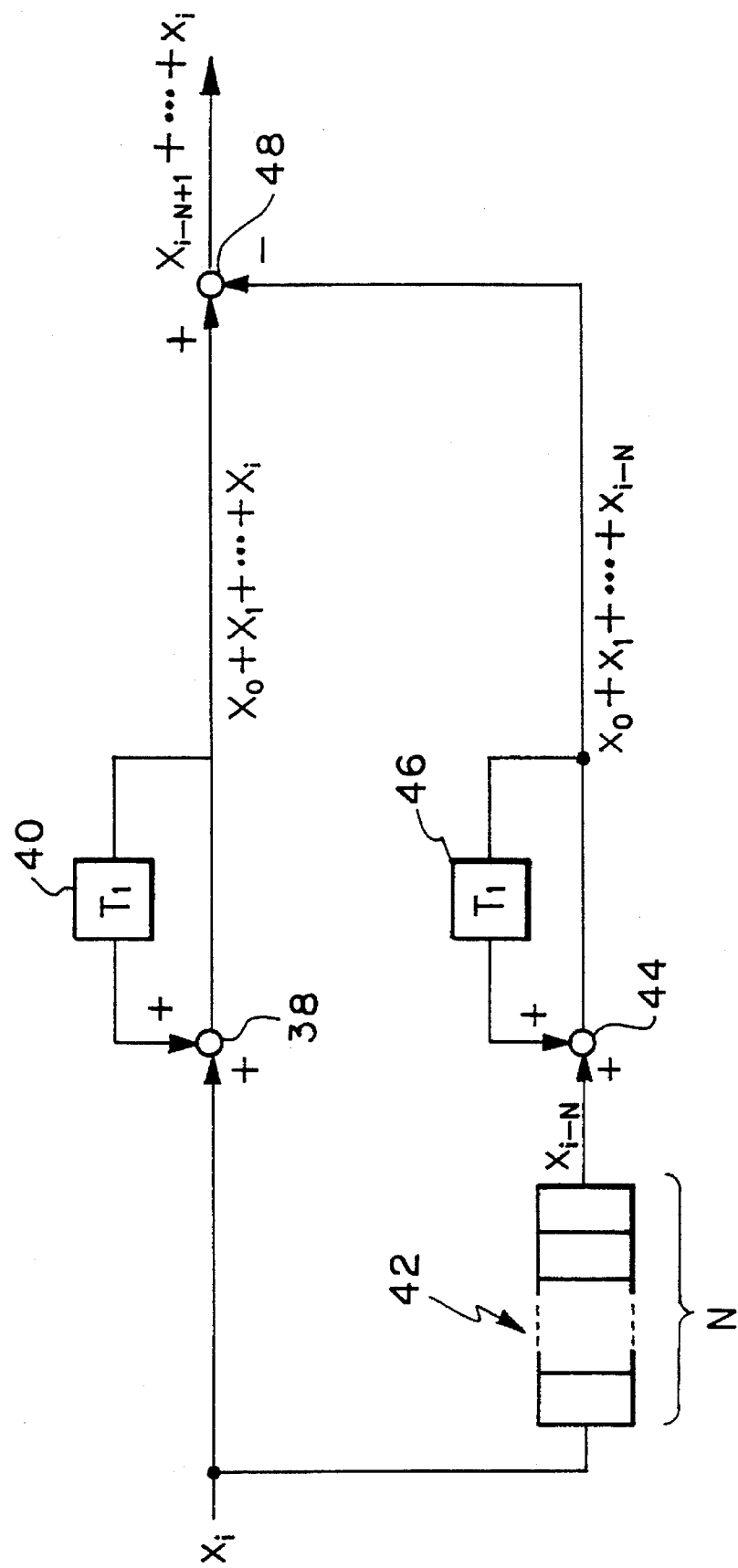
FIG. 5 is an equivalent circuit diagram for explaining an operation of a circuit for calculating a sum of recent samples of an input signal used in the circuit of FIG. 4.

In FIG. 5, a circuit consisting of an adder 38 and a delay element 40 outputs a sum of i samples $(x_0 + x_1 + \ldots + x_i)$. On the other hand, a circuit consisting of delay elements 42 and 46 and an adder 44 outputs a sum of i−N samples $(x_0 + x_1 + \ldots + x_{i-N})$, provided that N flip-flops constituting the delay element 42 are initially cleared to zero. Thus, a sum of recent N samples $(x_{i-N+1} + \ldots + x_i)$ is obtained in an output of the subtractor 48.

Returning to FIG. 4, the sum of the recent N samples of $\Delta\theta$ is divided by N in the divider 36 to obtain a moving average $\overline{\Delta\theta}$ of $\Delta\theta$. If N is $2^n$, division in the divider 36 is realized by shifting n bits.

The variation parameter calculation unit 14 is constituted by a multiplier 50 for calculating a square of the deviation $\sigma^2$ and a circuit for calculating a sum of the square $\Sigma\sigma^2$. The multiplier 50 can be realized by a ROM similar to the ROM 26. The circuit for calculating $\Sigma\sigma^2$ is constituted by delay elements 52, 54, a subtractor 56 and an adder 58 which have the same construction as that for calculating the sum of recent N samples of $\Delta\theta$.

The comparator 16 is realized by a digital comparactor 60.

According to the present invention, decision of existence of the burst signal is performed essentially not based on the amplitude of the received signal but based on the phase of the received signal. Therefore, fluctuation in amplitude of the received signal does not affect the decision, and the AGC can be operated to ensure the decision.

We claim:

1. A method for detecting an existence of a burst signal in received signals, comprising the steps of:

calculating a first parameter related to a phase angle of the received signals which include the burst signal;

calculating a second parameter related to a variance of the first parameter;

comparing the second parameter with a reference value and generating a result; and outputting a detection signal, indicative of the existence of the burst signal, based on a result obtained in the comparing step.

2. A method as claimed in claim 1, wherein the first parameter calculating step comprises the substeps of:

calculating the phase angle of the received signals; and calculating an angular velocity of the phase angle to be output as the first parameter.

3. A method as claimed in claim 2, wherein in the phase angle calculating substep, the phase angle is calculated according to a formula $\tan^{-1}(Q/I)$, where I and Q are magnitudes of two baseband signals obtained by quadrature detection of the received signal.

4. A method as claimed in claim 1, wherein the second parameter calculating step comprises the substeps of:

calculating a deviation of the first parameter from an expectation of the first parameter; and calculating the second parameter by summing a square of the deviation.

5. A method as claimed in claim 4, wherein the second parameter calculating step further comprises the substep of calculating a moving average of the first parameter to be output as the expectation of the first parameter.

6. A circuit for detecting an existence of a burst signal in received signals, comprising:

means for calculating a first parameter related to a phase angle of the received signals, said received signals including the burst signal;

means for calculating a second parameter related to a variance of the first parameter; and means for comparing the second parameter with a reference value, to thereby output a detection signal indicative of the existence of the burst signal, according to a result of the comparison.

7. A circuit as claimed in claim 6, wherein the first parameter calculating means includes means for calculating the phase angle of the received signal; and means for calculating an angular velocity of the phase angle to be output as the first parameter.

8. A circuit as claimed in claim 7, wherein the phase angle calculating means calculates the phase angle according to a formula $\tan^{-1}(Q/I)$, where I and Q are magnitudes of two baseband signals obtained by quadrature detection of the received signal.

9. A circuit as claimed in claim 6, wherein the second parameter calculating means comprises means for calculating a deviation of the first parameter from an expectation of the first parameter; and means for calculating the second parameter by summing a square of the deviation.

10. A circuit as claimed in claim 9, wherein the second parameter calculating means further comprises means for calculating a moving average of the first parameter as the expectation of the first parameter.

11. A method as claimed in claim 2, wherein the second parameter calculating step comprises the substeps of:

calculating a deviation of the first parameter from an expectation of the first parameter; and calculating the second parameter by summing a square of the deviation.

12. A method as claimed in claim 3, wherein the second parameter calculating step comprises the substeps of:

calculating a deviation of the first parameter from an expectation of the first parameter; and calculating the second parameter by summing a square of the deviation.

13. A circuit as claimed in claim 7, wherein the second parameter calculating means comprises:

means for calculating a deviation of the first parameter from an expectation of the first parameter; and means for calculating the second parameter by summing a square of the deviation.

14. A circuit as claimed in claim 8, wherein the second parameter calculating means comprises:

means for calculating a deviation of the first parameter from an expectation of the first parameter; and means for calculating the second parameter by summing a square of the deviation.

* * * * *

UNITED STATES PATENT AND TRADEMARK OFFICE
CERTIFICATE OF CORRECTION

PATENT NO.   :   5,457,710
DATED        :   Oct. 10, 1995
INVENTOR(S)  :   MIYO et al.

It is certified that error appears in the above-indentified patent and that said Letters Patent is hereby corrected as shown below:

Col. 1,   line 31, after "preamble" insert --of--.

Col. 5,   line 20 (Claim 9, line 2), after "comprises" insert --:--.

Signed and Sealed this

Twenty-eighth Day of May, 1996

Attest:

BRUCE LEHMAN

*Attesting Officer*   *Commissioner of Patents and Trademarks*